3,434,983
STAIN-RESISTANT COMPOSITION COMPRISING 2,2'-(1,2-CYCLOBUTYLENE) BIS 4,6-DIAMINE-S-TRIAZINE-MELAMIN-ALDEHYDE REACTION PRODUCT AND A FILLER
Norman W. Standish and William C. Nixon, Jr., Cleveland, Ohio, assignors to The Standard Oil Company, Cleveland, Ohio, a corporation of Ohio
Filed June 20, 1966, Ser. No. 558,746
Int. Cl. C08g 9/30, 9/28, 37/32
U.S. Cl. 260—17.3                10 Claims

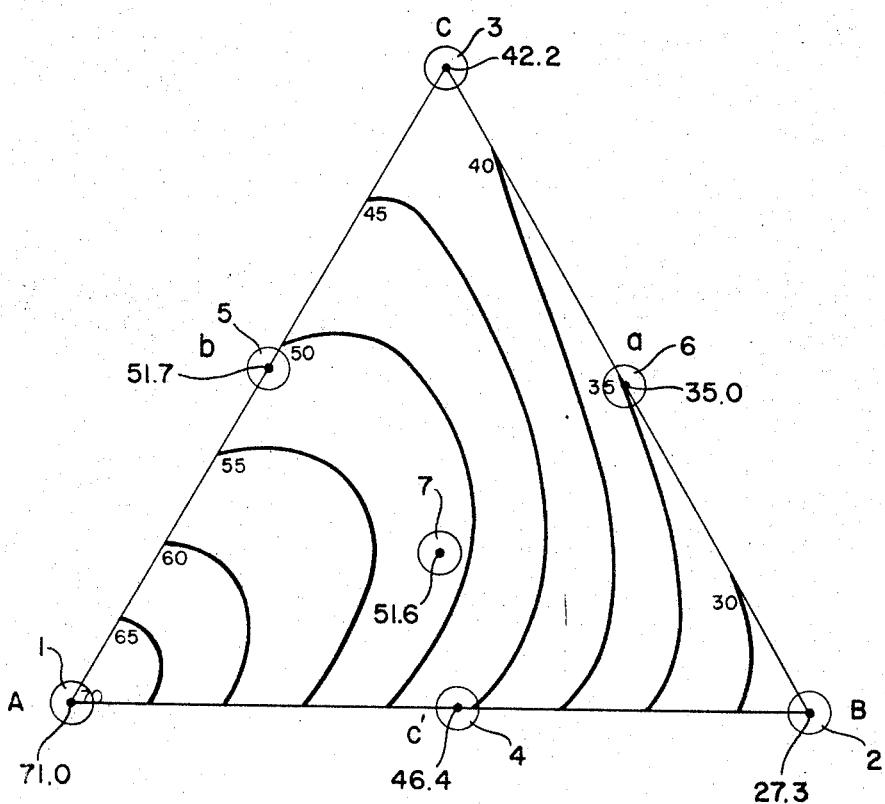
- A = 3:1 FORMALDEHYDE/MELAMINE
- a = 1:1 FORMALDEHYDE/MELAMINE
- B = 70% RESIN
- b = 50% RESIN
- C = 75/25 AND 1 GUANAMINE/MELAMINE
- c' = 25/75 AND 1 GUANAMINE/MELAMINE
*INVENTORS.*
NORMAN W. STANDISH &
WILLIAM C. NIXON
BY *Leland L. Chapman*
ATTORNEY

United States Patent Office 3,434,983
Patented Mar. 25, 1969

ABSTRACT OF THE DISCLOSURE

This invention relates to a stain-resisting reaction product of 1,2-cyclobutane dicarboguanamine, melamine and an aldehyde and molding composition comprising a filler produced therefrom.

---

This invention relates to a stain-resisting molding composition containing melamine, an aldehyde blending and cross-linking agent, and 2,2'-(1,2-cyclobutylene) bis [4,6-diamine-s-triazine], for brevity, hereinafter referred to as 1,2-cyclobutane dicarboguanamine.

Coffee and tea stains on melamine-type dinnerware have been a serious problem and subject to considerable study. It has been found, that by adding 1,2-cyclobutane dicarboguanamine and simultaneously reacting it with melamine and an aldehyde, the stain resistance of the dinnerware can be greatly improved. Formaldehyde is the most generally used blending and cross-linking agent, but aldehydes selected from the group of aliphatic, aromatic and heterocyclic aldehydes can also be used, as disclosed in the copending application Ser. No. 384,547.

The structural formula of 1,2-cyclobutane dicarboguanamine is as follows:

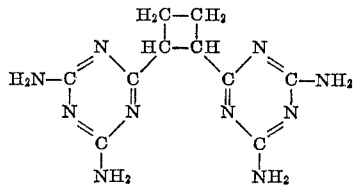

Copending application Ser. No. 384,547, filed on July 22, 1964, fully discloses 1,2-cyclobutane dicarboguanamine and the process for its preparation. This application is incorporated herein by reference to the extent necessary for a complete understanding of 1,2-cyclobutane dicarboguanamine and its process of preparation.

There are two ways of obtaining the 1,2-cyclobutane dicarboguanamine-aldehyde-melamine composition: sequential reaction and simultaneous reaction of the components.

Sequential reaction involves separately reacting melamine and an aldehyde, and 1,2-cyclobutane dicarboguanamine and an aldehyde, and then mixing the reaction products together. Sequential reaction can be represented in the following manner:

$$M+A \rightarrow X$$
$$D+A \rightarrow Y$$
$$X+Y \rightarrow \text{resin}$$

where:

M—melamine powder
D—1,2-cyclobutane dicarboguanamine powder
A—aldehyde

Simultaneous reaction involves reacting 1,2-cyclobutane dicarboguanamine, melamine, and an aldehyde together in a single reaction vessel. Simultaneous reaction can be represented as follows:

$$D+M+A \rightarrow \text{resin}$$

where D, M and A are defined as above.

Though some improvement in stain resistance is obtained by sequential reaction of the components, a much greater improvement is obtained by simultaneously reacting the components.

The novel resin is prepared by charging 1,2-cyclobutane dicarboguanamine and melamine into a reaction vessel placed in a hot water bath. Formalin, of a pH within the range of about 7 to 11, is added to the reaction vessel and the mixture is stirred. As the reactants are heated, 1,2-cyclobutane dicarboguanamine reacts with formaldehyde followed by the reaction of melamine with the remaining formaldehyde. The resulting composition is a resin having very good stain-resisting property.

A molding powder is prepared from this composition by the addition of conventional fillers and additives. Examples of such additives are pigments, mold-release agents, brighteners, etc. Examples of fillers are clay, asbestos, cellulose, paper, fibers, etc. The molding powder composition is then mixed, ground and dried. The dried composition is ball milled until a sample which is molded into a dish shows no mottled effect. The molded powder is densified and formed into a preform to be used in molding dinnerware or any other desired article.

Based on stain resistance and physical properties, preferred formulations are those having compositions falling within the following ranges:
(1) 1,2-cyclobutane dicarboguanamine to melamine weight ratio of 0.1:1 to 20:1.
(2) Aldehyde to 1,2-cyclobutane dicarboguanamine mole ratio between 1:1 and 8:1.
(3) Aldehyde to melamime molar ratio of between less than 1:1 and 3:1
(4) α-cellulose content of 20 to 70 parts per hundred parts of resin.

An especially preferred formulation has the following composition:
(1) 1,2-cyclobutane dicarboguanamine to melamine weight ratio of 1:1.
(2) Aldehyde to 1,2-cyclobutane dicarboguanamine molar ratio of 4:1
(3) Aldehyde to melamine molar ratio of less than 1:1
(4) α-cellulose content of 30 to 40 parts per hundred parts of resin.

EXAMPLE

Six hundred seven grams of 1,2-cyclobutane dicarboguanamine and 840 grams of melamine were charged to a three-necked, standard taper flask. The reaction flask was fitted with a stirrer, thermometer, and a condenser, and the entire assembly placed in a hot water bath (90 to 95° C.). Four hundred sixty-three grams of formaldehyde in water, with the pH adjusted with NH$_4$OH to 7.5–8.0, were added through the condenser into the flask and the contents stirred. The ratio of the added reactants was:

formaldehyde/melamine=1:1
formaldehyde/1,2-cyclobutane dicarboguanamine=4:1
melamine/1,2-cyclobutane dicarboguanamine=3:1

The contents of the flask were heated to about 70° C., at which temperature 1,2-cyclobutane dicarboguanamine rapidly reacted with formaldehyde. Heating was continued to about 85° C. at which point melamine reacted with the remaining formaldehyde. The reaction was terminated when the solution became clear.

The warm resin thus produced in the flask was added to 46.36 grams of titanium dioxide pigment in a mortar, and the contents ground to a thick paste. Additional resin was added in order to thin out the paste until it became a slurry. The slurry was then added to 55.1 grams of zinc stearate, a mold-release agent, and the contents thoroughly mixed.

The filler employed was α-cellulose paper. 817.2 grams of this paper were divided into small pieces and soaked in water. The water-soaked paper was shredded, and a part of it was then added to the resin containing titanium dioxide and zinc stearate to form a homogeneous blend. The remaining water suspension of paper was added to the blend with sufficient water to ensure complete distribution of the α-cellulose paper in the resin.

The molding composition thus prepared was air dried at room temperature by spreading it on flat enameled trays and placing the trays in a fume hood. The air drying takes from two to five days, depending on the moisture content of the molding composition. The molding composition was further dried in a vacuum desiccator under reduced pressure until a constant weight was obtained.

The dried molding composition was ball milled in a jar containing flint stones. The grinding time was 170 hours. The grinding of the molding composition was considered complete when molded samples showed no mottled effect. The molding powder was removed and separated from the flint stones by screening through a No. 10 mesh screen.

The molding powder was densified and preformed in one operation. The preforms were formed in a three-inch diameter mold mounted in a hydraulic press operated at room temperature. The powder was compressed under 700 ram force into a disc of about ⅜-inch thickness.

The disc was molded into a dish in a mold preheated to 325° F. and a ram force of 5000 pounds. The ram force was momentarily released to vent vapor and formaldehyde and was quickly returned to 5000-pound force. This operation took about five seconds. After venting the mold, the dish was cured in a four-minute cycle. Dishes of various compositions were molded and subjected to the following physical property tests.

A. Coffee Stain.—The molded dish was divided into two halves, and the stain test was performed on one-half of the molded dish. Test pieces were placed in a boiling coffee solution, 170 grams of instant coffee per 5000 ml. of water, for eight hours. Care was taken to keep a constant level by adding water periodically. Following the boiling period, the test pieces were allowed to steep in the coffee solution during a cooling period for a total of 16 hours. The total staining cycle consumed 24 hours. The test pieces were then washed in detergent and dried.

Stained test pieces were evaluated for yellowness index under ASTM D1925–62T. This test procedure determines the degree of yellowness which would be observed under daylight illumination. A yellowness index of zero indicates that the test dish is white. The instrument used for this test was a Hunterlab Model D25, Hunter Associates Laboratory, McLean, Virginia.

B. Impact strength.—Impact strength was measured by the height, in inches, that a 66-gram ball must be dropped in order to crack the surface of the dish. The dish was centered under the ball, which was then dropped onto the flat surface of the dish. The ball was raised a quarter inch for each test until a crack was formed. The dish was inspected for hairline cracks on the reverse side, by rubbing with pencil lead over the surface.

C. Scratch resistance.—Scratch resistance is measured on a Taber Shear/Scratch Tester. The dish was placed on a platform and a diamond tip at the end of a cantilever beam placed on the dish. The dish was rotated and weights on a calibrated cantilever beam were increased until a scratch appeared on the dish. Measurements were recorded as the weight in grams required to produce a scratch on the surface. This instrument is manufactured by Taber Instrument Corporation, North Tonawanda, N.Y.

D. Hardness.—Hardness is determined under the specifications of ASTM D785–62 on an Ames Portable Hardness Tester. The dish was placed between the ball and flat surface and then the major and minor loads were applied. Readings were made directly from a scale on the instrument. The manufacturer of the instrument is the Ames Precision Machine Works, Waltham, Mass.

Seven test dishes were prepared, of compositions indicated below, for an experimental matrix study.

| Test Dish | F/M [1] | Percent resin | D/M [2] mole ratio | Impact [3] strength (inches to crack) | Hardness Rockwell | Scratch resistance, Tabor | Yellow [4] index stained | Percent andiguanamine | Percent melamine | Percent formaldehyde | Percent cellulose |
|---|---|---|---|---|---|---|---|---|---|---|---|
| 1 | 3/1 | 50 | 25/75 | 18 | M120 | 325 | 71.0 | 13.2 | 18.0 | 18.7 | 50.1 |
| 2 | 1/1 | 70 | 25/75 | 7 | M113 | 250 | 27.3 | 22.2 | 30.8 | 17.0 | 30.0 |
| 3 | 1/1 | 50 | 75/25 | 24 | M115 | 275 | 42.2 | 30.7 | 4.7 | 14.6 | 50.0 |
| 4 | 2/1 | 60 | 25/75 | 9 | M110 | 250 | 46.4 | 17.2 | 24.0 | 18.9 | 39.9 |
| 5 | 2/1 | 50 | 50/50 | 12 | M115 | 275 | 51.7 | 23.6 | 10.8 | 15.6 | 50.0 |
| 6 | 1/1 | 60 | 50/50 | 18 | M120 | 250 | 35.0 | 29.7 | 13.9 | 16.4 | 40.0 |
| 7 | 1.7/1 | 63.3 | 41.6/50.4 | 14 | M17 | 275 | 51.6 | 27.1 | 17.4 | 36.7 | 36.8 |

[1] Formaldehyde to melamine ratio.
[2] 1,2-cyclobutane dicarboguanamine to melamine ratio.
[3] Height from which a 66-gram ball was dropped, causing dish to crack.
[4] ASTM D1925–62T.

The triangular chart in the attached drawing illustrates the experimental matrix study. The seven circles of the triangular chart numbered 1 to 7 represent seven test dishes. These numbers are keyed to the above table for cross reference. The other number appended to each of the circles is the yellowness index of the particular dish. Each curve on the chart corresponds to a particular yellowness index number. From the data in the above table and the attached chart, it is apparent that the yellowness index decreases with a decrease in the aldehyde/melamine ratio and with an increase in percent resin. Increasing the 1,2-cyclobutane dicarboguanamine/melamine ratio from 25/75 to 75/25 lowered the yellowness index. Increasing filler content had a negative effect on the yellowness index. The following table lends additional support to the above conclusions.

RESIN COMPOSITION VS. STAIN

[Ratio of 1,2-cyclobutane dicarboguanamine to formaldehyde fixed at 1:4 in all cases]

| Formaldehyde/melamine, mole ratio | Percent cellulose | Coffee stain yellowness index shift |
|---|---|---|
| 3 | 50 | 58.1 |
| 2 | 40 | 35.6 |
| 2 | 50 | 38.1 |
| 1 | 30 | 13.6 |
| 1 | 50 | 27.8 |
| 1 | 40 | 17.6 |

The data in the table below compares coffee stain shift in the yellowness index of 1,2-cyclobutane dicarboguanamine/melamine formulation with some of the commercially available stain-resistant formulations.

Comparison with commercial products
[STAIN RESISTANT PRODUCTS]

| Formulation: | Coffee stain shift in yellowness index |
|---|---|
| Cymel 1075 [1] | 12.0 |
| Plaskon MAPG [2] | 18.9 |
| 1,2-cyclobutane dicarboguanamine/melamine [3] | 13.6 |

[1] Commercial melamine-formaldehyde resin containing benzoguanamine as the stain-resisting substance.
[2] Commercial melamine-formaldehyde resin containing methylacetylpimeloguanamine as the stain-resisting substance.
[3] Formaldehyde/1,2-cyclobutane dicarboguanamine 4; formaldehyde/melamine 1; 30% cellulose; 1,2-cyclobutane dicarboguanamine/melamine 25/75.

It is seen from these data that the stain resistance of the composition of this invention compares favorably with that of commercially available stain-resistant compositions.

It is noteworthy, however, that the commercial product containing benzoguanamine as the stain-resisting substance suffers from poor ultraviolet stability and reduced impact strength. The commercial product containing methylacetylpimeloguanamine to inhibit yellowness has a faint blue color in the final molded product—an undesirable feature. Products containing 1,2-cyclobutane dicarboguanamine as the stain-resisting ingredient do not suffer these disadvantages.

Cure times of 1,2-cyclobutane dicarboguanamine/melamine molding powder, using common accelerators, are equivalent or shorter than existing commercial products. Phthalic anhydride gave good results (cure time—30 seconds with no preheat) at a concentration of 0.05 percent.

The physical properties (impact strength, hardness and scratch resistance) of 1,2-cyclobutane dicarboguanamine/melamine molded articles fall within commercially acceptable levels. A very pronounced advantage in flow characteristics of the molding material has been observed. A more fluid state is reached during molding, a feature that is very desirable if fillers are to be used.

The 1,2-cyclobutane dicarboguanamine/melamine resins are completely miscible with water at room temperature. This property offers advantage in many areas such as paper laminates, wood treating, wet-strength paper, industrial finishes, paints, textiles, etc.

As was earlier pointed out, coffee and tea stains on melamine-type dinnerware pose a serious problem. It has been shown herein that melamine-type dinnerware, having incorporated therein an amount of 1,2-cyclobutane dicarboguanamine, compares or even surpasses other commercially available, stain-resistant melamine-type dinnerware having incorporated therein different stain-inhibiting substances.

We claim:
1. The reaction product of 2,2'-(1,2-cyclobutylene)bis [4,6-diamine-s-triazine], melamine, and an aldehyde.
2. The reaction product of claim 1 wherein said aldehyde is formaldehyde and the weight ratio of 2,2'-(1,2-cyclobutylene) bis [4,6-diamine-s-triazine] to melamine is within the range of about 0.1:1 to 20:1, the molar ratio of formaldehyde to 2,2'-(1,2-cyclobutylene) bis [4,6-diamine-s-triazine] is within the range of about 1:1 to 8:1, and the molar ratio of formaldehyde to melamine is within the range of about 1:1 to 3:1.
3. The reaction product of claim 1 wherein said aldehyde is formaldehyde and the weight ratio of 2,2'-(1,2-cyclobutylene) bis [4,6-diamine-s-triazine] to melamine is about 1:1, the molar ratio of formaldehyde to melamine is less than 1:1, and the molar ratio of formaldehyde to 2,2'-(1,2-cyclobutylene) bis [4,6-diamine-s-triazine] is about 4:1.
4. A molding composition comprising the reaction product of claim 1 and a filler.
5. The molding composition of claim 4 wherein said filler is α-cellulose paper and is present in an amount within the range of about 20 to 70 parts per hundred parts of said reaction product.
6. A molding composition comprising the reaction product of claim 3 and a filler comprising from about 30 to 40 parts of α-cellulose paper per hundred parts of said reaction product.
7. A molded article of manufacture having improved stain resistance comprising a reaction product of 2,2'-(1,2-cyclobutylene) bis [4,6-diamine-s-triazine], melamine, an aldehyde; and a filler.
8. The article of claim 7 wherein the weight ratio of 2,2'-(1,2-cyclobutylene) bis [4,6-diamine-s-triazine] to melamine is within the range of about 0.1:1 to 20:1, the molar ratio of aldehyde to 2,2'-(1,2-cyclobutylene) bis [4,6-diamine-s-triazine] is within the range of about 1:1 to 8:1, and the molar ratio of aldehyde to melamine is within the range of about 1:1 to 3:1.
9. The article of claim 7 wherein said filler is α-cellulose paper and is present in an amount within the range of about 20 to 70 parts per hundred parts of said reaction product; and said aldehyde is formaldehyde.
10. The article of claim 8 wherein said filler is α-cellulose paper and is present in an amount within the range of about 20 to 70 parts per hundred parts of said reaction product; and said aldehyde is formaldehyde.

References Cited

UNITED STATES PATENTS

| 2,325,105 | 7/1943 | Bruson et al. | 260—17.3 |
| 2,423,071 | 6/1947 | Thurston. | |

FOREIGN PATENTS 608,186  9/1948  Great Britain.

WILLIAM H. SHORT, Primary Examiner.
E. M. WOODBERRY, Assistant Examiner.

U.S. Cl. X.R.
260—67.6